UNITED STATES PATENT OFFICE.

ALLEN ROGERS, OF BROOKLYN, NEW YORK, ASSIGNOR TO OCEAN BOND CO. INC., OF NEW YORK, N. Y., A CORPORATION OF NEW YORK.

PROCESS FOR TREATING SHARK-SKINS AND THE LIKE.

1,395,773.    Specification of Letters Patent.    Patented Nov. 1, 1921.

No Drawing.    Application filed July 19, 1919. Serial No. 311,921.

*To all whom it may concern:*

Be it known that I, ALLEN ROGERS, a citizen of the United States, residing at Brooklyn, State of New York, have invented certain new and useful Improvements in Processes for Treating Shark-Skins and the like, of which the following is a specification, reference being had therein to the accompanying drawing.

This invention relates to the treatment of skins of sharks and the like, to remove the hard or horny coating or dermal armor. Many attempts have been made to remove this coating by chemical and mechanical means, but outside of the process described in my application Serial No. 295,549, filed May 8, 1919, in which I describe the treatment of the skin with hot water while still on the animal, the efforts have been unsuccessful and satisfactory results have not been attained.

The present process overcomes the difficulties heretofore experienced in this art, and is applicable to skins that have been removed, and which may be in a dry, fresh or salted condition.

The present invention enables one to accomplish the desired results in much less time, with less labor, at a cost that is comparatively small inasmuch as the bath, when once prepared, may be used over again almost indefinitely before losing its efficiency.

In carrying out my invention, the skins are first soaked in water to bring them to a soft and natural condition. They are then placed in a salt solution to which has been added one-half its volume of commercial hydrochloric acid, and as many pounds of salt as there are gallons of acid used. In making up this bath, I have found that the following proportions give the most satisfactory, and, possibly, the best, results attainable:—

Water _____ 2 gallons.
Hydrochloric acid_____ 1 gallon.
Salt _____ 3 pounds.

The addition of more salt, I find in no way interferes with the results, but if less salt is employed there is great danger of the skins becoming tender.

Although the above proportions give exceedingly satisfactory results, I have found in practice that other quantities of the materials may be used, but in every case the strength of acid must be far greater than that usually employed in the so-called "pickling" process.

While hydrochloric acid, in combination with salt, gives most satisfactory results, I have found that other acids, such as sulfuric, nitric, acetic, lactic, and formic, will produce nearly equally satisfactory results.

In the practice of my process, the dermal armor becomes loosened in about one and one-half hours, and may then be easily removed over the beam, as is the customary practice for unhairing the pelts of land animals.

Although the dermal armor may be readily removed when the skin is taken from the acid, I find it preferable to transfer the stock for a short time to a 10° Baumé salt solution. The object of this second bath is to remove the excess acid and thus obviate the necessity of protecting the hands of the workmen by rubber gloves.

While at first thought it may seem that this process would be too expensive for practical purposes on account of the large amount of acid required, it is a fact that only a small quantity of acid is actually consumed. A bath once prepared may be run almost indefinitely before losing its efficiency or becoming unfit for use. By a simple chemical test, the exhausted acid may be determined and the strength cheaply and quickly restored.

The salt solution used as the second bath gradually becomes acid on account of the liquid carried over from the first treatment. This excess of acid may be readily neutralized from time to time by adding sufficient sodium carbonate to bring it back to its normal condition.

I have also found that in removing the dermal armor strong solutions of nitercake, (salt-cake, sodium acid sulfate) will also give very satisfactory results. The best strength to use, however, is 10° Baumé.

The skins, having been de-armored, are in a pickled condition, and may then be handled in the same manner as are pickled skins from land animals.

If sulfuric acid is employed in lieu of the hydrochloric acid, I use only one-half gallon to each two gallons of water, likewise the same amount of nitric or formic acid should be employed. If either acetic or lactic acid is used, I employ one gallon of each to each two gallons of water.

Modifications within the scope of the appended claims may be resorted to without departing from the spirit of the invention or sacrificing any of its advantages.

What is claimed as new is:—

1. A step in the method for removing the dermal armor from shark skins and the like, which consists in subjecting them to the action of a salt solution to which has been added a large percentage of acid.

2. A step in the method of removing the dermal armor from shark skins and the like, which consists in subjecting them to the action of a solution consisting of water, an acid and salt.

3. A step in the method of removing the dermal armor from shark skins and the like, which consists in subjecting them to the action of a solution consisting of water, an acid and salt in substantially the proportions specified.

4. A step in the method of removing the dermal armor from shark skins and the like, which consists in first soaking the same in water to bring them to a soft and natural condition and then subjecting them to a saturated salt solution containing an acid.

5. A step in the method of removing the dermal armor from shark skins and the like, which consists in first soaking the same in water to bring them to a soft and natural condition and then subjecting them to a salt solution containing an acid and an excess of salt.

6. A step in the method of removing the dermal armor from shark skins and the like as stated in claim 1, and the subsequent removal of the excess of acid.

7. A step in the method of removing the dermal armor from shark skins and the like as stated in claim 1, with the further step of submerging the skins in a salt solution to remove the excess of acid.

8. A preliminary step in the treatment of shark skins and the like, which consists in subjecting the same to a solution of water, salt, and an acid, in substantially the proportions specified.

9. The method of treating shark skins and the like, which consists in subjecting the same to an acid treatment, and subsequently to a salt solution to remove the acid.

10. The method of treating shark skins and the like, which consists in subjecting them to an acidified solution of common salt and subsequent removal of the excess of acid from the skins by a solution of common salt.

In testimony whereof I affix my signature in the presence of two witnesses.

ALLEN ROGERS.

Witnesses:
C. G. SHREIMER,
ALFRED STRAUSS.